(12) United States Patent
Kain

(10) Patent No.: US 11,022,511 B2
(45) Date of Patent: Jun. 1, 2021

(54) SENSOR COMMONALITY PLATFORM USING MULTI-DISCIPLINE ADAPTABLE SENSORS FOR CUSTOMIZABLE APPLICATIONS

(71) Applicant: Aron Kain, Suffern, NY (US)

(72) Inventor: Aron Kain, Suffern, NY (US)

(*) Notice: Subject to any disclaimer, the term of this patent is extended or adjusted under 35 U.S.C. 154(b) by 156 days.

(21) Appl. No.: 16/388,089

(22) Filed: Apr. 18, 2019

(65) Prior Publication Data

US 2019/0323911 A1    Oct. 24, 2019

Related U.S. Application Data

(60) Provisional application No. 62/659,652, filed on Apr. 18, 2018.

(51) Int. Cl.
*G01L 19/00*    (2006.01)
*G01L 9/00*    (2006.01)
*G01L 1/22*    (2006.01)

(52) U.S. Cl.
CPC ............ *G01L 19/0092* (2013.01); *G01L 1/22* (2013.01); *G01L 9/0051* (2013.01)

(58) Field of Classification Search
None
See application file for complete search history.

(56) References Cited

U.S. PATENT DOCUMENTS

| | | | |
|---|---|---|---|
| 4,177,357 A | 12/1979 | Mayer | |
| 4,288,291 A | 9/1981 | Cisco et al. | |
| 4,343,020 A | 8/1982 | Stapleton | |
| 4,361,833 A | 11/1982 | Allgood | |
| 4,418,359 A | 11/1983 | Stapleton | |
| 4,423,936 A | 1/1984 | Johnson | |
| 4,670,974 A | 6/1987 | Antoszewski et al. | |
| 4,860,216 A | 8/1989 | Linsenmayer | |
| 4,908,951 A | 3/1990 | Gurny | |
| 5,019,777 A | 5/1991 | Gulliver et al. | |
| 5,040,157 A | 8/1991 | Roderick et al. | |
| 5,054,882 A | 10/1991 | Riccitelli et al. | |
| RE33,774 E | 12/1991 | Gurny | |
| 5,107,249 A | 4/1992 | Johnson | |
| 5,166,990 A | 11/1992 | Riccitelli et al. | |

(Continued)

FOREIGN PATENT DOCUMENTS

KR    10-2017-0044483 A    4/2017

OTHER PUBLICATIONS

International Search Report and Written Opinion dated Oct. 29, 2019, from the corresponding International Application No. PCT/US2019/015572.

*Primary Examiner* — Lisa M Caputo
*Assistant Examiner* — Nigel H Plumb
(74) *Attorney, Agent, or Firm* — Katten Muchin Rosenman LLP

(57) ABSTRACT

Disclosed herein is a sensor commonality platform comprising a plurality of adaptable sensors for customizable applications. Each adaptable sensor comprises a displacement structure for reacting to changes in a measurable physical property and a core sensor electronics module for measuring displacement of the displacement structure in response to the changes in the measurable physical property. At least one sensor has a displacement structure different than that of another sensor, with the core electronics being the same.

7 Claims, 3 Drawing Sheets

(56) References Cited

U.S. PATENT DOCUMENTS

| | | |
|---|---|---|
| 5,189,590 A | 2/1993 | Schneider |
| 5,247,490 A | 9/1993 | Goepel et al. |
| 5,302,941 A | 4/1994 | Berube |
| 5,307,272 A | 4/1994 | Butler et al. |
| 5,307,289 A | 4/1994 | Harris |
| 5,312,590 A | 5/1994 | Gunasingham |
| 5,333,129 A | 7/1994 | Buckingham |
| 5,376,106 A | 12/1994 | Stahmann et al. |
| 5,451,960 A | 9/1995 | Kastella et al. |
| 5,483,160 A | 1/1996 | Gulliver et al. |
| 5,541,653 A | 7/1996 | Peters et al. |
| 5,553,500 A | 9/1996 | Grahn et al. |
| 5,604,314 A | 2/1997 | Grahn |
| 5,645,513 A | 7/1997 | Haydocy et al. |
| 5,680,048 A | 10/1997 | Wollny |
| 5,686,669 A | 11/1997 | Hernandez et al. |
| 5,700,360 A | 12/1997 | Chan et al. |
| 5,709,839 A | 1/1998 | Dobson |
| 5,793,174 A | 8/1998 | Kovach et al. |
| 5,804,715 A | 9/1998 | Bennett |
| 5,872,536 A | 2/1999 | Lyons et al. |
| 5,881,163 A | 3/1999 | Slump et al. |
| 5,901,242 A | 5/1999 | Crane et al. |
| 5,968,329 A | 10/1999 | Anderson et al. |
| 5,990,646 A | 11/1999 | Kovach et al. |
| 6,057,658 A | 5/2000 | Kovach et al. |
| 6,088,810 A | 7/2000 | Ribes et al. |
| 6,128,019 A | 10/2000 | Crocker, III et al. |
| 6,132,593 A | 10/2000 | Tan |
| 6,181,089 B1 | 1/2001 | Kovach et al. |
| RE37,065 E | 2/2001 | Grahn |
| 6,204,768 B1 | 3/2001 | Kosugi et al. |
| 6,247,347 B1 | 6/2001 | Dimora |
| 6,259,218 B1 | 7/2001 | Kovach et al. |
| 6,324,899 B1 | 12/2001 | Discenzo |
| 6,338,010 B1 | 1/2002 | Sparks et al. |
| 6,359,586 B1 | 3/2002 | Sviestins |
| 6,369,530 B2 | 4/2002 | Kovach et al. |
| 6,381,340 B1 | 4/2002 | Storey |
| 6,384,605 B1 | 5/2002 | Li |
| 6,397,130 B1 | 5/2002 | Carr et al. |
| 6,415,188 B1 | 7/2002 | Fernandez et al. |
| 6,430,986 B2 | 8/2002 | DiMora |
| 6,442,993 B2 | 9/2002 | DiMora |
| 6,445,292 B1 | 9/2002 | Jen et al. |
| 6,445,983 B1 | 9/2002 | Dickson et al. |
| 6,525,329 B1 | 2/2003 | Berman |
| 6,526,395 B1 | 2/2003 | Morris |
| 6,560,279 B1 | 5/2003 | Renz |
| 6,577,976 B1 | 6/2003 | Hoff et al. |
| 6,649,416 B1 | 11/2003 | Kauer et al. |
| 6,663,756 B2 | 12/2003 | Lee et al. |
| 6,718,041 B2 | 4/2004 | Debail |
| 6,757,641 B1 | 6/2004 | Immer et al. |
| 6,767,758 B1 | 7/2004 | Geen |
| 6,771,208 B2 | 8/2004 | Lutter et al. |
| 6,792,309 B1 | 9/2004 | Noren |
| 6,834,560 B1 | 12/2004 | Brundage |
| 6,837,107 B2 | 1/2005 | Geen |
| 6,845,665 B2 | 1/2005 | Geen |
| 6,848,304 B2 | 2/2005 | Geen |
| 6,853,315 B2 | 2/2005 | Schiller et al. |
| 6,909,997 B2 | 6/2005 | Chen et al. |
| 6,922,664 B1 | 7/2005 | Fernandez et al. |
| 6,944,566 B2 | 9/2005 | Chen et al. |
| 6,967,612 B1 | 11/2005 | Gorman et al. |
| 6,974,006 B2 | 12/2005 | Ruckman et al. |
| 6,975,944 B1 | 12/2005 | Zenhausern |
| 6,993,988 B2 | 2/2006 | Brundage |
| 7,010,970 B2 | 3/2006 | Rediniotis et al. |
| 7,038,780 B2 | 5/2006 | Chovan et al. |
| 7,065,465 B2 | 6/2006 | Chen |
| 7,079,023 B2 | 7/2006 | Haller |
| 7,096,159 B2 | 8/2006 | Cataltepe et al. |
| 7,102,503 B2 | 9/2006 | Tsuyoshi et al. |
| 7,146,286 B2 | 12/2006 | Takeda et al. |
| 7,192,403 B2 | 3/2007 | Russell |
| 7,283,904 B2 | 10/2007 | Benjamin et al. |
| 7,292,833 B2 | 11/2007 | Marro et al. |
| 7,295,125 B2 | 11/2007 | Gabriel |
| 7,296,485 B2 | 11/2007 | Kain |
| 7,343,051 B1 | 3/2008 | Hsu |
| 7,351,982 B2 | 4/2008 | Hofstetter et al. |
| 7,367,222 B2 | 5/2008 | Kahn et al. |
| 7,443,310 B2 | 10/2008 | Boran et al. |
| 7,446,694 B1 | 11/2008 | Ahmed et al. |
| 7,480,577 B1 | 1/2009 | Feller |
| 7,576,681 B2 | 8/2009 | Chen et al. |
| 7,642,898 B1 | 1/2010 | Malocha et al. |
| 7,664,300 B2 | 2/2010 | Lange et al. |
| 7,680,192 B2 | 3/2010 | Kaplinsky |
| 7,697,839 B2 | 4/2010 | Cutler |
| 7,701,874 B2 | 4/2010 | Kline et al. |
| 7,733,595 B2 | 6/2010 | Lucas et al. |
| 7,772,533 B2 | 8/2010 | Brock et al. |
| 7,777,625 B1 | 8/2010 | Puccio et al. |
| 7,800,527 B2 | 9/2010 | Douglass et al. |
| 7,869,566 B2 | 1/2011 | Edic et al. |
| 7,899,272 B1 | 3/2011 | Hsu |
| 7,903,871 B2 | 3/2011 | Kaplinsky et al. |
| 7,921,695 B2 | 4/2011 | Larocque |
| 7,957,902 B2 | 6/2011 | Karabin et al. |
| 7,961,105 B2 | 6/2011 | Puccio et al. |
| 8,004,488 B2 | 8/2011 | Park |
| 8,009,200 B2 | 8/2011 | Goh et al. |
| 8,085,882 B1 | 12/2011 | Su |
| 8,119,980 B2 | 2/2012 | Malmin et al. |
| 8,186,201 B2 | 5/2012 | Petrovic |
| 8,224,282 B2 | 7/2012 | Songkakul et al. |
| 8,233,353 B2 | 7/2012 | Zhang et al. |
| 8,249,811 B2 | 8/2012 | Petrovic |
| 8,265,818 B2 | 9/2012 | Allport |
| 8,288,713 B2 | 10/2012 | Goebel et al. |
| 8,290,741 B2 | 10/2012 | Otts |
| 8,295,409 B1 | 10/2012 | Su |
| 8,355,834 B2 | 1/2013 | Duggan et al. |
| 8,364,312 B2 | 1/2013 | Tobey |
| 8,395,907 B2 | 3/2013 | Marszalek et al. |
| 8,417,482 B2 | 4/2013 | Bohan et al. |
| 8,443,647 B1 | 5/2013 | Kolmakov et al. |
| 8,512,241 B2 | 8/2013 | Bandy et al. |
| 8,545,417 B2 | 10/2013 | Banet et al. |
| 8,558,907 B2 | 10/2013 | Goh et al. |
| 8,575,926 B2 | 11/2013 | Chao et al. |
| 8,579,838 B2 | 11/2013 | Jang et al. |
| 8,602,793 B1 | 12/2013 | Sniedzins |
| 8,612,894 B2 | 12/2013 | Kim |
| 8,615,284 B2 | 12/2013 | Arneson et al. |
| 8,622,922 B2 | 1/2014 | Banet et al. |
| 8,649,930 B2 | 2/2014 | Reeve et al. |
| 8,718,838 B2 | 5/2014 | Kokkeby et al. |
| 8,740,807 B2 | 6/2014 | Banet et al. |
| 8,755,469 B1 | 6/2014 | Su |
| 8,767,071 B1 | 7/2014 | Marshall |
| 8,797,206 B2 | 8/2014 | Uysal et al. |
| 8,856,692 B2 | 10/2014 | Kim |
| 8,859,268 B2 | 10/2014 | Mukundan et al. |
| 8,869,095 B2 | 10/2014 | Long et al. |
| 8,930,161 B2 | 1/2015 | Baek et al. |
| 8,934,884 B2 | 1/2015 | Hee et al. |
| 8,963,428 B2 | 2/2015 | Kang et al. |
| 8,964,027 B2 | 2/2015 | Zhang et al. |
| 8,994,513 B2 | 3/2015 | Watt |
| 9,001,229 B2 | 4/2015 | Goh et al. |
| 9,008,794 B2 | 4/2015 | Alexandre |
| 9,030,408 B2 | 5/2015 | Latta et al. |
| 9,057,777 B2 | 6/2015 | Guignard et al. |
| 9,063,016 B2 * | 6/2015 | Bohan ................. G01L 19/0092 |
| 9,099,125 B1 | 8/2015 | Hattori et al. |
| 9,108,841 B1 | 8/2015 | Bowles et al. |
| 9,124,778 B1 | 9/2015 | Crabtree |
| 9,149,230 B2 | 10/2015 | Caron et al. |
| 9,173,592 B2 | 11/2015 | Bandy et al. |
| 9,176,089 B2 | 11/2015 | Le Neel et al. |

(56) References Cited

U.S. PATENT DOCUMENTS

| | | |
|---|---|---|
| 9,222,867 B2 | 12/2015 | Norling et al. |
| 9,237,635 B2 | 1/2016 | Kang et al. |
| 9,246,543 B2 | 1/2016 | Zhou et al. |
| 9,251,683 B2 | 2/2016 | Petrovic |
| 9,255,923 B2 | 2/2016 | Mukundan et al. |
| 9,277,204 B2 | 3/2016 | Gilliland et al. |
| 9,285,501 B2 | 3/2016 | Christy |
| 9,288,875 B2 | 3/2016 | Billig et al. |
| 9,305,596 B2 | 4/2016 | Trantham et al. |
| 9,327,965 B2 | 5/2016 | Gogoi |
| 9,339,211 B2 | 5/2016 | Banet et al. |
| 9,347,029 B2 | 5/2016 | Zou et al. |
| 9,360,310 B2 | 6/2016 | Sala et al. |
| 9,367,119 B2 | 6/2016 | Sala et al. |
| 9,376,310 B2 | 6/2016 | Bowles et al. |
| 9,391,986 B2 | 7/2016 | Schultz et al. |
| 9,393,975 B2 | 7/2016 | Chen |
| 9,395,339 B2 | 7/2016 | Sarr et al. |
| 9,396,745 B2 | 7/2016 | Macken et al. |
| 9,411,042 B2 | 8/2016 | Brady et al. |
| 9,417,107 B2 | 8/2016 | Xiang |
| 9,420,264 B2 | 8/2016 | Gilliland et al. |
| 9,476,730 B2 | 10/2016 | Samarasekera |
| 9,488,492 B2 | 11/2016 | Samarasekera et al. |
| 9,500,739 B2 | 11/2016 | Woodruff |
| 9,504,392 B2 | 11/2016 | Woodruff et al. |
| 9,513,376 B1 | 12/2016 | Heinrich et al. |
| 9,514,751 B2 | 12/2016 | Kim |
| 9,536,549 B1 | 1/2017 | Geae et al. |
| 9,552,834 B1 | 1/2017 | Sapozhnikov et al. |
| 9,557,177 B2 | 1/2017 | Zhang et al. |
| 9,580,302 B2 | 2/2017 | Zhang et al. |
| 9,618,653 B2 | 4/2017 | Le Neel et al. |
| 9,672,462 B2 | 6/2017 | Mlybari et al. |
| 9,681,043 B2 | 6/2017 | Chen et al. |
| 9,685,177 B2 | 6/2017 | Ge et al. |
| 9,689,824 B2 | 6/2017 | Le Neel et al. |
| 9,698,193 B1 | 7/2017 | Karim et al. |
| 9,710,413 B2 | 7/2017 | Leo et al. |
| 9,711,127 B2 | 7/2017 | Hui et al. |
| 9,715,009 B1 | 7/2017 | Parker et al. |
| 9,750,457 B2 | 9/2017 | Hallberg |
| 9,758,368 B2 * | 9/2017 | Gogoi ...................... B81B 7/02 |
| 9,804,659 B2 | 10/2017 | Gu et al. |
| 9,810,653 B2 | 11/2017 | Shankar et al. |
| 9,817,203 B2 | 11/2017 | Lakshmikumar et al. |
| 9,818,445 B2 | 11/2017 | Zhu et al. |
| 9,833,171 B2 | 12/2017 | Yin et al. |
| 9,862,594 B2 | 1/2018 | Gogoi |
| 9,870,791 B1 | 1/2018 | Sapozhnikov et al. |
| 9,890,038 B2 | 2/2018 | Gogoi |
| 9,900,109 B2 | 2/2018 | Bandy et al. |
| 9,901,741 B2 | 2/2018 | Chapman et al. |
| 9,909,930 B2 | 3/2018 | Zivkovic et al. |
| 9,910,128 B2 | 3/2018 | Griggs et al. |
| 9,911,340 B2 | 3/2018 | Samarasekera et al. |
| 9,921,331 B2 | 3/2018 | Miles |
| 9,921,835 B2 | 3/2018 | Peixoto Machado Da Silva et al. |
| 9,983,173 B2 | 5/2018 | Aslanyan et al. |
| 9,933,329 B2 | 6/2018 | Hansen et al. |
| 9,996,617 B2 | 6/2018 | Hassan et al. |
| 9,999,924 B2 | 6/2018 | Dave et al. |
| 10,007,349 B2 | 6/2018 | Latta et al. |
| 10,013,634 B2 | 7/2018 | Sharma et al. |
| 10,014,026 B1 | 7/2018 | Wu |
| 10,017,525 B2 | 7/2018 | Margulies et al. |
| 10,033,989 B2 | 7/2018 | Wu et al. |
| 10,037,753 B2 | 7/2018 | Hui et al. |
| 10,054,543 B2 | 8/2018 | Schnee |
| 10,075,623 B2 | 9/2018 | Roozeboom et al. |
| 10,082,438 B2 | 9/2018 | Zhang |
| 10,088,157 B2 * | 10/2018 | Sutton ...................... F23N 3/002 |
| 10,092,268 B2 | 10/2018 | Krimsky et al. |
| 10,094,797 B2 | 10/2018 | Le Neel et al. |
| 10,109,080 B2 | 10/2018 | Brady et al. |
| 10,123,722 B2 * | 11/2018 | Banet ...................... A61B 5/721 |
| 10,126,155 B1 | 11/2018 | AlSahan |
| 10,182,728 B2 | 1/2019 | Gu et al. |
| 10,185,563 B2 | 1/2019 | Peixoto Machado Da Silva et al. |
| 10,193,377 B2 | 1/2019 | Ping |
| 10,203,493 B2 | 2/2019 | Kirma et al. |
| 10,222,500 B2 | 3/2019 | Leboeuf |
| 10,241,097 B2 | 3/2019 | Miresmailli et al. |
| 10,241,191 B2 | 3/2019 | Palzek et al. |
| 2007/0119266 A1 * | 5/2007 | Kain ........................ G01L 1/25 73/862 |
| 2012/0081106 A1 * | 4/2012 | Grinberg ................ G01B 7/023 324/207.15 |
| 2017/0370694 A1 * | 12/2017 | Yoshida ................... G01B 7/14 |
| 2018/0113005 A1 * | 4/2018 | Selvaraj ............... G01D 5/2006 |

\* cited by examiner

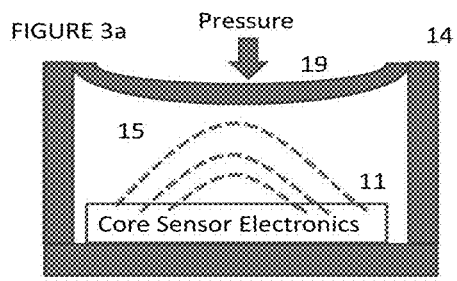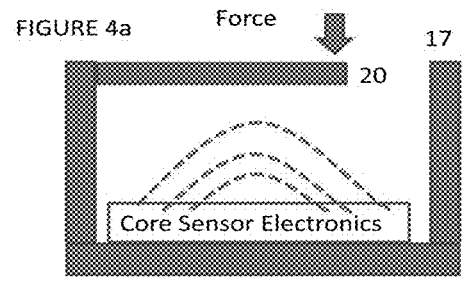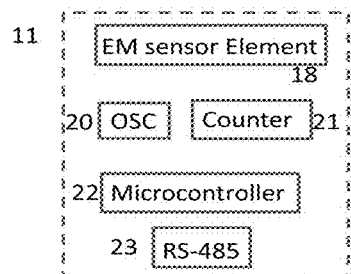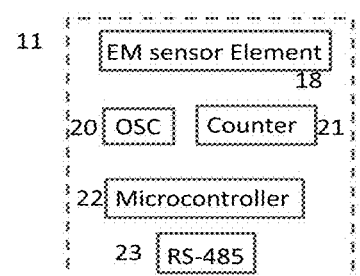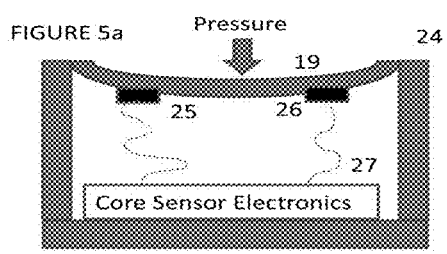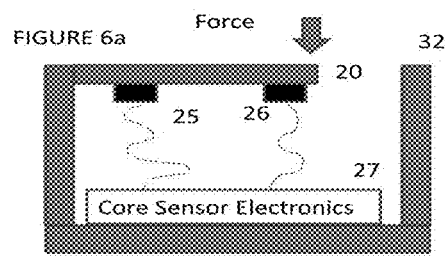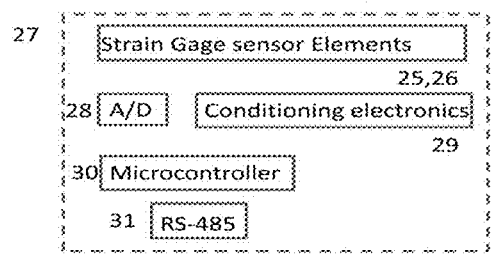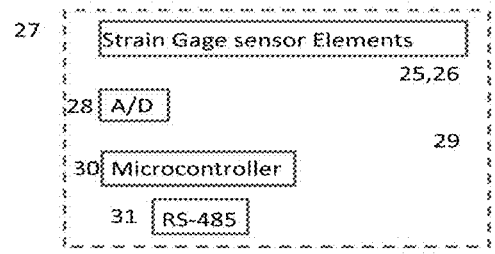

SENSOR COMMONALITY PLATFORM USING MULTI-DISCIPLINE ADAPTABLE SENSORS FOR CUSTOMIZABLE APPLICATIONS

CROSS-REFERENCE TO RELATED APPLICATIONS

This application claims priority to U.S. Provisional Application Ser. No. 62/659,652, filed Apr. 18, 2018, the entire contents of which are hereby incorporated in their entirety.

FIELD OF INVENTION

This invention relates to sensors and sensor systems and more particularly to sensors whose measurement principles are based on, but not limited to, electromagnetic waves and fields, optoelectronics, ultrasonics, and piezoresistive technologies. Even more particularly, this invention relates to sensors that measure physical parameters which include, but are not limited to, such devices that measure proximity, force, load, pressure, velocity, acceleration, flow, and torque. Even more particularly, this invention relates to sensors that employ a change in frequency or phase as the method for measuring the desired parameter.

BACKGROUND

Sensors come in a variety of types and use a variety of technologies in order to accomplish their sensing measurements. Typically, a variety of sensors are combined as needed to form a sensor system platform. Integration of these various sensors, using the various technologies, is usually very costly, complex and difficult. This is due to the need for the integration of a multitude of sensors into a single platform where each type of physical parameter sensor can come from multiple vendors, each with their own idiosyncrasies, and the lack of commonality in signal conditioning circuitry, communications, command, and control between vendors, devices, and technologies. It is very much like a conductor trying to put together an orchestra from such varied instruments as harpsichords, trumpets, and electric guitars.

Multi-discipline physical parameter sensors (force, pressure, angle, displacement, flow, proximity, torque, speed, temperature, etc.) are found in virtually all operational industrial, commercial, and military systems that rely on sensor input for their proper function. Examples of such diverse systems using physical parameter sensor systems are factory automation, pharmaceutical production, cargo ship handling, and heart-lung machines. The challenge in provisioning and integrating a platform with multi-discipline and multi quantity physical parameter sensors is both (1) the ability to acquire the sensor information in a common uniform format from vastly different sensor inputs such as force, pressure, angle, displacement, and flow and (2) the ability to integrate these multi-discipline sensors purchased from a multitude of vendors, with each vendor's sensor having its own unique characteristics, into a single uniform, cohesive system. These two challenges significantly contribute to a platform's high cost, lack of commonality and adaptability to other systems, complex maintainability, platform specific dedicated personnel, prohibitive upgrading and outfitting logistic challenges, not to mention the overall platform's lifetime total cost of ownership. The ability to integrate a multitude of various physical parameter sensors that are plug and play into a common system backbone that is easily adaptable and usable in virtually any operational platform, without the need to consider multi vendor idiosyncrasies, would significantly lower platform development costs and improve affordability, adaptability, and overall total cost of ownership.

To be sure, sensor networks exist in the arts that allow multiple sensor types to be integrated into a uniform system however, the integration is done as an afterthought to sensor determination. Meaning, once the sensor type and quantity are determined, then a commonality platform is either designed or adapted or provisioned for allowing all the varied sensors to communicate over a single system. For example, one may have a desired system of force sensors from vendor X that provides an analog output of 0-5V, a pressure sensor from company Y that provides a 4-20 mA analog output, and a proximity sensor that provides a PWM output. It is then up to the system integrator to provide a commonality platform that allows all these diverse outputs to be collected, analyzed, and communicated over, for example, a Bluetooth or IoT network. This integration in general requires, bespoke electronics designs, extensive testing, complex software, and costly expenses.

However, many have tried to reduce this complexity and cost by using various means. U.S. Pat. Nos. 9,758,368 and 9,890,038 to Gogoi combines multiple sensor types onto a single MEMS substrate reducing sensor footprint, but each sensor type remains its own individual sensor thereby requiring the need for integration of its unique electronic requirements with any other sensor type on the unified MEMS substrate. U.S. Pat. No. 10,123,722 to Banet et al. discloses a multi-sensor system for crop monitoring but essentially combines various discrete sensors into a common housing, rather than combining the various sensors into a common sensor platform. Similarly U.S. Pat. No. 10,088,157 to Sutton et al discloses a multi-sensor probe for combustion monitoring which combines a discrete oxygen and a discrete temperature sensor onto a single probe that is used at a plurality of locations, but each sensor stands alone and provides a signal that needs to be integrated individually into the overall system. U.S. Pat. No. 9,063,016 to Bohan et al discloses a failsafe multi-sensor component comprising different sensor types but none are integrated into a common sensor topology, rather they are individual sensors with their own characteristics that are integrated into an overall system.

SUMMARY OF THE INVENTION

In accordance with the principles of the present invention the focus for generating a commonality platform among different sensor types is placed on the sensor technology itself, whereby multiple sensor types are generated from a common core sensor design.

It is an advantage of the present invention that by focusing on the sensor as the core of commonality rather than the downstream electronics for conditioning, command, control, and communications, the overall system's complexity is greatly reduced It is yet a further advantage of the present invention that by using a core sensor technology, multiple sensor types can be generated by simply changing the mechanical structure that generates the desired measurable quantity rather than redesigning the overall sensor for each type of sensor measurement device.

It is yet a further advantage of the present invention that by using multiple core sensor technologies, heretofore complex sensing systems are greatly simplified by using the common core technologies as appropriate for the kinds of measurements that greatly benefit from the core technology. For example, measurements of force, pressure, proximity may benefit from a common core technology of displacement measurement, while long range proximity, particulate detection, and aerosol detection might benefit from a laser light detection core technology where both the displacement and laser light core technologies are combined into a single sensor system.

BRIEF DESCRIPTION OF THE DRAWINGS

FIGS. 3a and 3b are one preferred embodiment of a pressure sensor of the invention as taught herein.
FIGS. 4a and 4b are one preferred embodiment of a force sensor of the invention as taught herein
FIGS. 5a and 5b are another preferred embodiment of a pressure sensor of the invention as taught herein
FIGS. 6a and b are another preferred embodiment of a force sensor of the invention as taught herein

DETAILED DESCRIPTION

Figure 1:
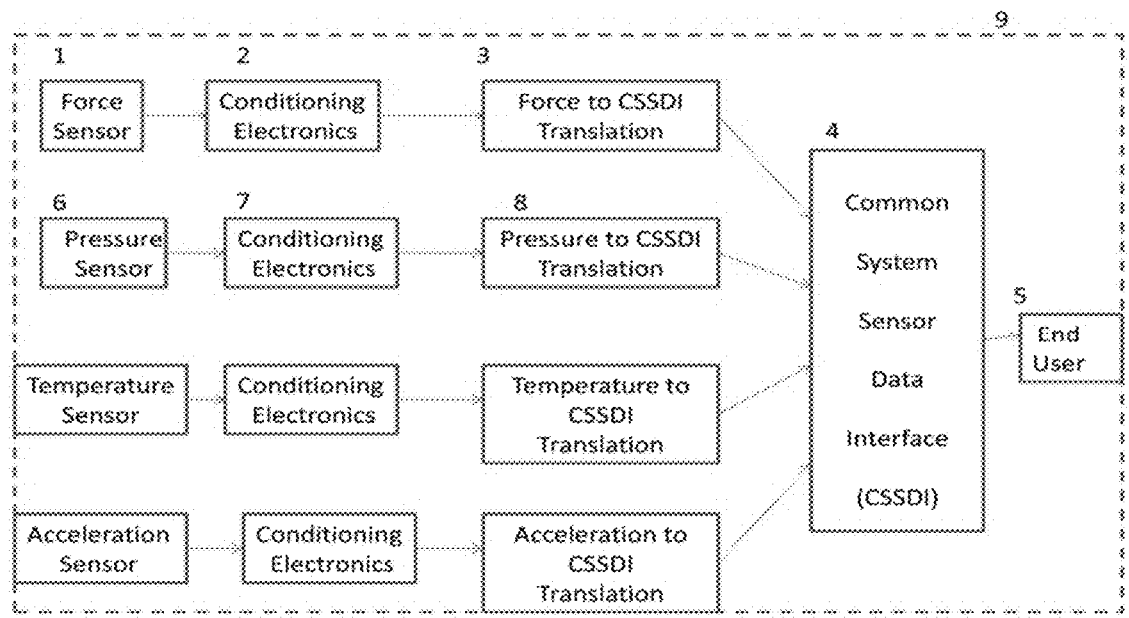
FIG. 1 is a block diagram of the prior art.

Prior art (FIG. 1) sensor commonality platforms include a multitude of sensors such as a force sensor 1 and/or pressure sensor 6. Each sensor has its own conditioning electronics 2,7 such that the sensor can be supplied with electrical power as well as generate a signal that is proportional to the quantity that is being measured. However, these electrical signals must be converted and translated to be useful to the overall system. The overall system will have a common system sensor data interface (CSSDI) 4 that allows all the sensor data to be transported to the end user in some uniform manner. The CSSDI 4 might take the form of a wireless link such as Bluetooth or Wi-Fi as is well known in the arts. However, in order for the sensor and its associated conditioning electronics 2, 7 to be able to supply data to the CSSDI 4, each sensor type must have its own individual translator. For example, the force to CSSDI translator 3, takes the unique force signal generated by the force sensor 1 and translates it to the CSSDI interface so that the CSSDI 4 can distribute it too the end user 5. Similarly, pressure sensor 6 has its own individual pressure to CSSDI translator 8 that performs the same function. This allows each type of sensor to interface with the commonality system employed by the CSSDI 4. However, such an overall sensor system 9 is complex, requires unique CSSDI translation designs for each type sensor, and is quite costly, sometimes even prohibiting the development of the sensor system 9 to begin with.

Figure 2:
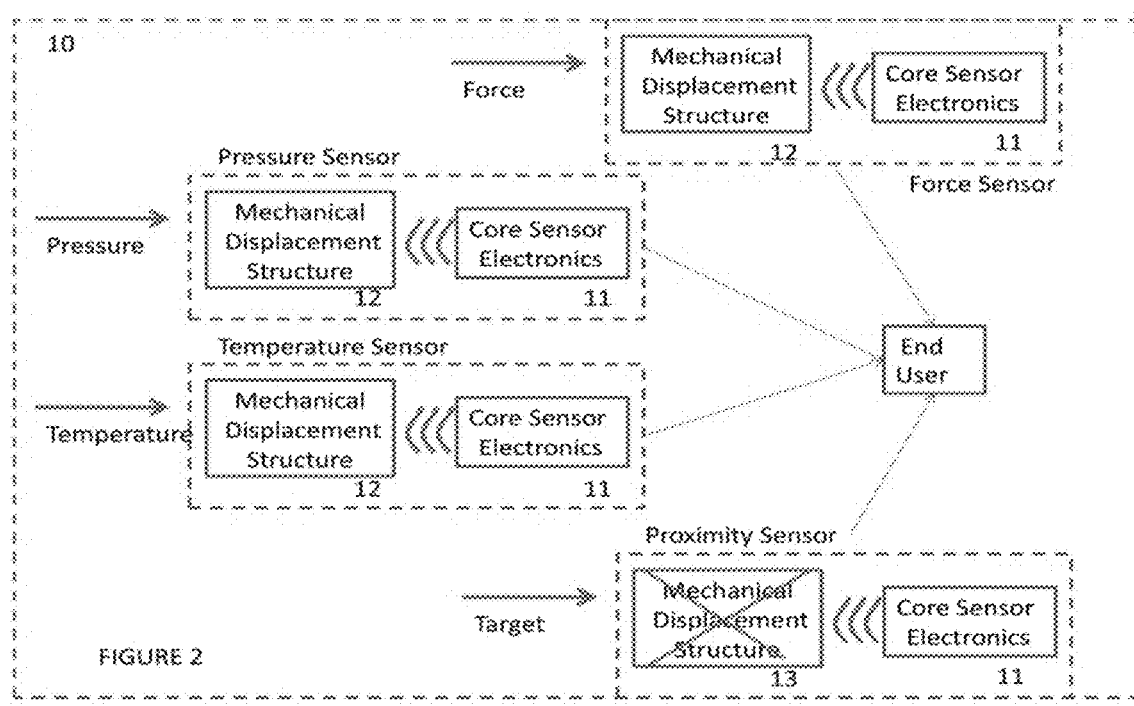
FIG. 2 is a block diagram of the invention as taught herein.

In accordance with the principles of the present invention, a commonality sensor-centric platform is disclosed in FIG. 2. The overall sensor system 10 is comprised of the same sensor types/categories as that of sensor system 9 of the prior art, however, the sensors themselves embody all the components and structures necessary for commonality. There is no longer a need for the CSSDI 4 or conditioning electronics 2, 7 or sensor type to CSSDI translators 3, 8. Each sensor type in the present disclosure has identical core sensor electronics 11 that contains, in part, the necessary design that allows for commonality of any derivable sensor type. Each sensor type is comprised of the core sensor electronics 11 and the mechanical displacement structure 12. While the core sensor electronics 11 remains identical from sensor type to sensor type, the mechanical displacement structure will change in order to give the appropriate sensor type measurement capability. In certain sensor types, such as a proximity sensor or a material characterization sensor, the mechanical displacement structure 13 is not even present and the core sensor electronics 11 itself, either picks up the targets distance in the case of a proximity sensor, or senses the material characteristics that it is designed to measure in the case of a material characterization sensor. As such, a sensor-centric family of multi discipline sensor types is created as taught herein that allows multiple sensors and multiple sensor types to act in common concert with each other since each sensor possesses the identical core sensor electronics that binds them all together. Hence, downstream electronics that are usually required to realize a commonality sensor platform are completely eliminated.

It is understood by those skilled in the art that a sensor-centric commonality platform 10 has many advantages over present art. For example, hardware requirements such as ancillary electronic capability are reduced, different sensors and sensor types can be added/removed from the system without system redesign allowing for organic and inorganic system growth, plug-and-play sensors can be added to enhance system capability, etc. Additionally, by having common core sensor electronics 11 that reside in each sensor and sensor type manufacturing costs and design costs are greatly reduced as only one type of electronics need to be fabricated. Similarly, mechanical housing costs are reduced as a standard footprint can be designed here and only small changes need be implemented in order to achieve the desired different sensor types. Additionally, sensor and sensor system robustness and reliability are increased as only one canonical sensor topology needs to be characterized with minor changes to realize each individual sensor type.

FIGS. 3a and 3b illustrate one preferred embodiment for a pressure sensor 14, while FIGS. 4a and 4b illustrate one preferred embodiment for a force sensor 17. The pressure sensor 14 is comprised of the mechanical displacement structure 19, in this case a diaphragm that deflects due to the imposed pressure, and the core sensor electronics 11. The sensing technology that allows the core sensor electronics 11 to detect and measure the diaphragm displacement can be that of an electromagnetic (EM) non-contact displacement technique using perturbation of the electromagnetic fields 15, for example, as taught by Kain in U.S. Pat. No. 7,296,485, the entire contents of which are hereby incorporated by reference in their entirety. Further, the EM sensor element may be a planar spiral inductor (or other inductor) as taught in co-pending PCT Application Serial No. PCT/US2019/015572, filed Jan. 29, 2019, the entire contents of which are hereby incorporated by reference in their entirety.

The core sensor electronics 11, in this example of sensing technology, consists of the EM sensor element 18, embedded in an oscillator 20, whose change in frequency due to the deflection of the diaphragm under pressure is measured by frequency counter 21, who in turn is controlled by microcontroller 22, who in turn communicates this measured change in frequency, and hence, change in pressure, via an RS-485 communications device 23. Notice that the force sensor 17 of FIG. 4a is almost identical to the pressure sensor 14 except that the diaphragm 19, the mechanical displacement structure 12 of FIG. 2, is replaced by the cantilever beam 20, which now deflects due to a force applied to its movable end. Core sensor electronics 11 in FIG. 4b is identical to that of core sensor electronics 11 in FIG. 3b. It will be appreciated by those skilled in the art that although we have only detailed two sensor types here, pressure and force, many other sensor types can be realized by simply changing the mechanical displacement structure 12 in order to achieve the desired measurement capability. However, regardless of the topology of the mechanical displacement structure 12, the core sensor electronics 11, that allows each senor type to communicate and have a common topology, remains identical in each sensor type. As such, it is apparent that a family of various sensor types can be constructed to form a commonality platform 10, with all of its advantages over the current state of the art, as taught in FIG. 2.

It will be appreciated by those skilled in the art that the invention as taught herein, is not limited to one particular sensing technology (i.e., one specific type of core sensor electronics 11), such as taught by Kain. Other sensing technologies can be marshaled to realize the same invention as taught herein. For example, FIGS. 5a and 5b illustrate a pressure sensor 24, but use strain gage technology to measure the pressure. Strain gages 25 and 26 are attached to the mechanical displacement structure 12, the diaphragm 19, which in turn connects via wires to core sensor electronics 27, analogous to element 11 in FIG. 2. The core sensor electronics 27, comprises the strain gages 25 and 26, conditioning electronics to operate the strain gages and generate the appropriate output signal, analog to digital converter 28 that converts the output signal from the strain gages 25 and 26 to a digital signal that microcontroller 30 reads and processes, which in turn sends the data out over the commonality platform via the RS-485 protocol/device 31.

FIG. 6a depicts a force sensor 32 comprising a cantilever beam 20 to which force is applied. Strain gages 25 and 26 are used to measure the force and core sensor electronics 27. It is obvious to those skilled in the art that FIGS. 3 and 4 are directly analogous to FIGS. 5 and 6 with the only difference being the core sensor electronics technology used to realize the sensor. FIGS. 3 and 4 employed EM based technology as taught by Kain, while FIGS. 5 and 6 employed strain gage technology to achieve the same sensor types. As such, the invention as taught herein is broadly applicable to many types of sensing technologies and it is up to the designer to choose which technology is best suited for his or her application. Equally as important, the designer can integrate two or more core technology families into a single commonality platform by combining both technologies in the core sensor electronics or providing a simplified bridge between each technology family, similar to a CSSDI 4, but much simpler and less costly to implement. Meaning, it is easier to provide commonality between two different core sensor electronics technology, such as EM and strain gage, each with maybe 10 different sensor types sharing the technology's common core sensor electronics, rather than trying to have a commonality platform accommodating 20 different sensor types each with their individual characteristics. It will be appreciated by those skilled in the arts that the invention as taught herein is not limited to only EM and strain gage based sensor types but can, and do, include other sensor technologies such as piezoelectric, magnetorestrictive, ultrasonic, laser and any other sensor technology where appropriate for the designer to implement a sensing capability.

Figure 7:
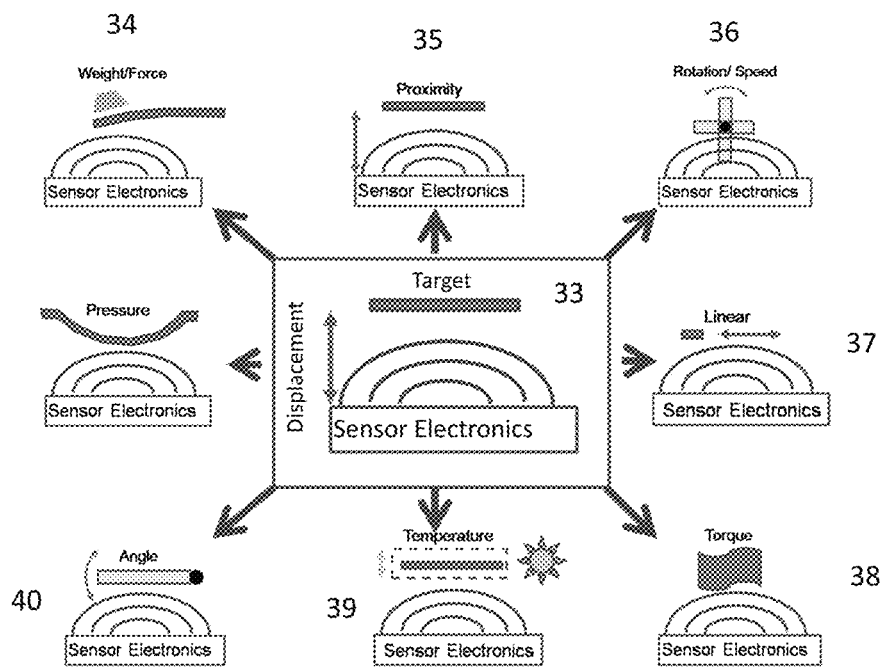
FIG. 7 depicts a first plurality of sensors that can be constructed using a common set of sensor electronics.
Figure 8:
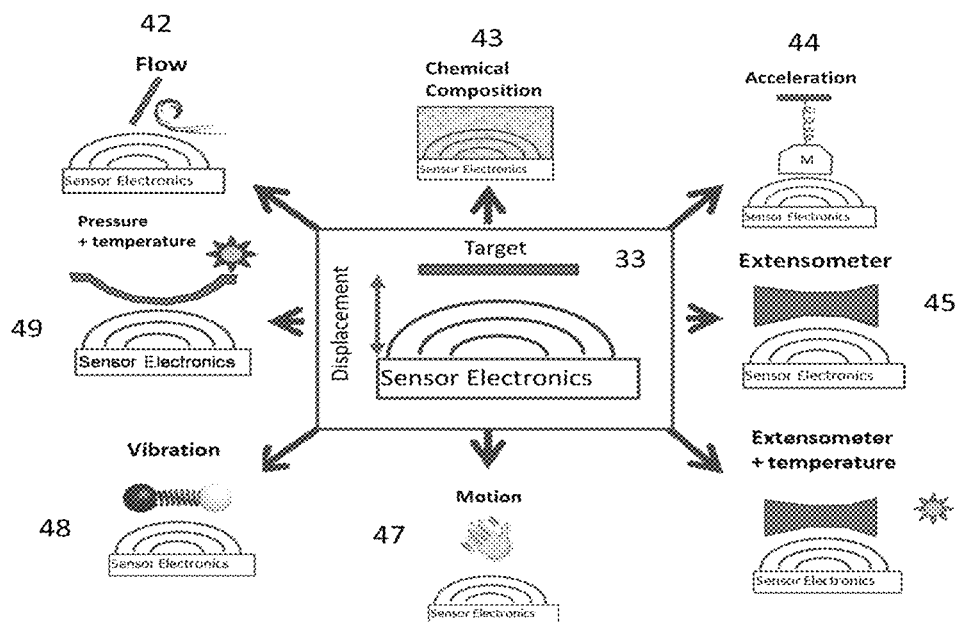
FIG. 8 depicts a second plurality of sensors that can be constructed using a common set of sensor electronics.

Nor is the invention as taught herein limited to the previously indicated embodiments of pressure and force of FIGS. 3-6. FIGS. 7 and 8 depict a variety of sensor types that can be realized by using a single, canonical core sensor electronics 33 or 11, and simply varying the mechanical displacement structure 12. For example, using the core sensor electronics 33, a weight sensor 34, proximity sensor 35, rotational speed sensor 36, linear displacement sensor 37, torque sensor 38, temperature sensor 39, angular/inclinometer sensor 40, and pressure sensor 41 can all be realized by simply modifying the mechanical displacement structure 12 that best gives the desired measured quantity.

One can further see examples of the invention as taught herein in FIG. 8 where a flow sensor 42, chemical composition sensor 43, acceleration sensor 44, extensometer 45, motion sensor 47, and vibration sensor 48 all utilize the same core sensor electronics 33. Furthermore, depending on the designers mechanical displacement structure 12 application needs, combinations of 1 or more physical measurement parameters may be combined into a single sensor such as the pressure and temperature sensor 49, and the extensometer and temperature sensor of 46. One skilled in the art will appreciate the numerous multiple combinations of sensor possibilities so that the invention as taught herein is not limited to only those embodiments shown in FIGS. 3-8.

The invention claimed is:

1. A sensor system comprising a plurality of sensors, wherein each sensor of the plurality of sensors comprises:
   a displacement structure for reacting to changes in a measurable physical property; and
   a core sensor electronics module for measuring displacement of the displacement structure in response to the changes in the measurable physical property,
   wherein a first displacement structure of a first sensor of the plurality of sensors is different than a second displacement structure of a second sensor of the plurality of sensors; and
   wherein the core sensor electronics of the first sensor and the core sensor electronics of the second electronics module are the same.

2. The sensor system according to claim 1,
   wherein the first sensor is a pressure sensor and wherein the second sensor is a force sensor.

3. The sensor system according to claim 1,
   wherein the first displacement structure is a diaphragm, and
   wherein the second displacement structure is a cantilever beam.

4. The sensor system according to claim 3, wherein the core sensor electronics module of each sensor comprises:
   an electromagnetic sensor element embedded in an oscillator,
   wherein an output change of the oscillator is selected from the group consisting of a change in amplitude, a change in frequency, and a change in phase, and
   wherein means of measuring the output change is selected from the group consisting of counters, microcontrollers, phase locked loops, downconverters, slope detectors, and phase detectors.

5. The sensor system according to claim 3, wherein the core sensor electronics module of each sensor comprises:
   a plurality of strain gages coupled to the displacement structure; and
   means for converting an output of the plurality of strain gages to a digital signal representative of a measured physical property,
   wherein the means for converting is selected from a group consisting of microcontrollers, analog to digital converters, voltage amplifiers, current amplifiers, transimpedance amplifiers, and conditioning electronics.

6. The sensor system according to claim 1, wherein the plurality of sensors are selected from the group consisting of a weight sensor, a force sensor, a proximity sensor, a rotation sensor, a velocity sensor, a pressure sensor, a linear displacement sensor, a rotation angle sensor, a temperature sensor, a torque sensor, a flow sensor, a chemical composition sensor, an acceleration sensor, a temperature sensor, an extensometer sensor, a vibration sensor, and a motion sensor.

7. A sensor system comprising a first sensor system and a second sensor system, wherein the first sensor system comprises:
   a first plurality of sensors,
      wherein each sensor of the first plurality of sensors comprises a same first core sensor electronics module;
wherein the second sensor system comprises:
   a second plurality of sensors,
      wherein each sensor of the second plurality of sensors comprises a same second core sensor electronics module different than the first same first core sensor electronics module; and
wherein the sensor system comprises:
   a translation module for translating an output of the first sensor system and an output of the second sensor system to a common communication output; and
   a communication module for wired or wirelessly communicating the common communication output to a user device operated by an end user.

\* \* \* \* \*